United States Patent [19]

Antonio et al.

[11] 4,030,955
[45] June 21, 1977

[54] METHOD OF MANUFACTURE DECORATIVE LAMINATE TO PROVIDE GLUE ADHERABLE BACK SURFACE

[75] Inventors: Christo Antonio, Princeton; Wyman F. Uhl, Sterling, both of Mass.

[73] Assignee: Litton Business Systems, Inc., Fitchburg, Mass.

[22] Filed: Nov. 5, 1974

[21] Appl. No.: 521,054

[52] U.S. Cl. .............................. 156/235; 156/288; 156/289; 428/152; 428/914
[51] Int. Cl.² .......................................... B32B 31/00
[58] Field of Search ............................ 156/230–241, 156/288, 289, 323; 428/152, 914

[56] References Cited
UNITED STATES PATENTS

| | | | |
|---|---|---|---|
| 2,680,700 | 6/1954 | Meyers | 156/289 X |
| 3,511,731 | 5/1970 | Raynal | 428/530 X |
| 3,770,536 | 11/1973 | Haigh | 156/71 |

FOREIGN PATENTS OR APPLICATIONS 1,221,477  6/1960  France .............................. 156/230

Primary Examiner—William A. Powell
Attorney, Agent, or Firm—Arthur T. Groeninger; Norman Friedman; Morris I. Pollack

[57] ABSTRACT

A heat and pressure consolidated laminate in which the back most sheet has fused thereto a surface film composition of polyvinyl alcohol, animal glue or starch which serves a glue line to which conventional glues adhere, the film being adhered to the back most sheet during heat pressure consolidation of the laminate by transferring the same from a release layer to the back most surface of the laminate and fusing the transferred film to the thermosetting resin impregnated in the back sheet.

2 Claims, 1 Drawing Figure

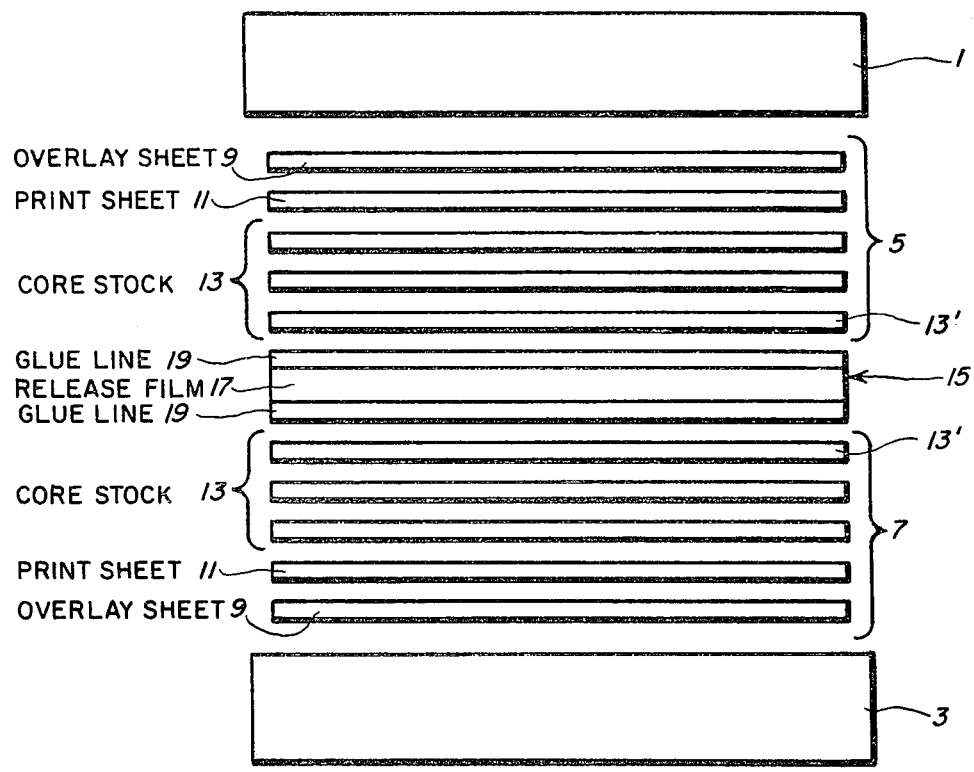
Fig._1

METHOD OF MANUFACTURE DECORATIVE LAMINATE TO PROVIDE GLUE ADHERABLE BACK SURFACE

BACKGROUND OF THE INVENTION

1. Field of the Invention

In making decorative laminates, a plurality of sheets are impregnated with a thermosetting resin and stacked in superimposed relation with a decorative sheet placed on top.

The assembly is then heat and pressure consolidated. Generally, more than one laminate is formed at one time by inserting a plurality of assembled sheets in a stack with each assembly being separated by a release sheet which allows the individual laminates to be separated after heat and pressure consolidation.

The laminates so formed are than bonded to a substrate such as plywood, hardboard, asbestos board, particle board, and the like by the use of adhesives such as contact adhesives, urea-formaldehyde, white glues (polyvinyl acetate emulsions), hot melts, phenolic or resorcinol-formaldehyde epoxy, coal tar, animal glues and the like.

Before the laminate can be applied to its supporting substrate, it must be first sanded on its back most surface. This is because conventionally used adhesives will not directly adhere to the phenolic impregnated in the back sheet. In addition, the release medium separating the laminates, has some of the release material on its surface transfer to the back surface of the laminate. By back most surface, it is meant to refer to the exposed flat surface of the laminate which is furthest away from the decorative sheet.

The sanding operation is an expensive step in the process and adds to the cost of the product. While the use of contact adhesives avoids this problem to a certain extent, the expense involved in using such adhesives together with the fact that the laminate manufacturer can not predict what type of adhesive will be used, makes sanding a standard step in laminate manufacture. The sanding operation has an additional shortcoming where exceedingly thin laminates are made as the laminates frequently become damaged during the sanding operation because of their extreme thinness. This results in rejects.

For a considerable period of time, the laminating industry has been seeking some method of perfecting a technique that would allow the manufacture of a decorative laminate capable of directly adhering, without a sanding operation, to a supporting substrate by use of conventional low priced adhesives.

2. Prior Art

The only known pertinent prior art in U.S. Pat. Re No. 27644 which issued to Peter Barnard Kelley et al wherein the back surface of a decorative laminate is coated with a polyvinyl acetate composition. This coating delaminates with moderate temperature fluctuation and does not in practice serve as a glue line for urea-formaldehyde and phenol resorcinol which are two of the most commonly used adhesives for securing a laminate to a supporting substrate.

BRIEF DESCRIPTION OF THE INVENTION

The present invention provides the back most sheet of a decorative laminate with a glue line comprising a film composition selected from polyvinyl alcohol, animal glue or starch. The glue lines formed from these compositions readily adhere to all conventionally used glues, for adhering a laminate to a supporting substrate.

The glue line is adhered to the back surface incidental to conventional laminate manufacture by transferring the same from a release medium used to separate laminate assemblies during manufacture.

DRAWING

FIG. 1 is an exploded view of two sheet assemblies about to be formed into decorative laminates in a laminating press.

DETAILED DESCRIPTION

Referring to FIG. 1, a conventional laminating press is schematically illustrated comprising heated platens 1 and 3 which are adapted to apply heat and pressure to superimposed sheet assemblies 5 and 7. Assemblies 5 and 7 are placed back to back and each of these assemblies 5 and 7 comprise a top layer 9 which comprises an overlay sheet adapted to provide wear and abrasion resistance to the underlying print sheet 11. Beneath the print sheet 11 are several layers of core stock 13 which impart rigidity to the laminate. Each of the sheets are impregnated with a thermosetting resin with generally a phenolic being used in the core stock 13 and a clear melamine formaldehyde being used in the print and overlay sheets 9 and 11. It is to be understood that other thermosetting resins could be used.

A release medium 15, constructed in accordance with the present invention, comprising a release film 17, separates the assemblies 5 and 7 so that after heat and pressure consolidation of the assemblies into finished decorative laminates the same may be readily separated. In addition, opposite surfaces of release film 17 have glue lines 19 adhered thereto which, simultaneously with heat and pressure consolidation of the assemblies 5 and 7, release from film 17 to the back most core sheets 13' of each of the assemblies 5 and 7. Glue line 19 permits the laminate to be adhered by use of conventional adhesives to a supporting substrate.

While not essential, the back most sheets 13' can be creped to further enhance adherability of the surface to conventionally used glues.

A feature of the present invention is that release medium 15 is merely substituted for release sheets currently being employed in the laminating industry and therefore, at minimal increase in manufacturing cost, the subsequent sanding step is eliminated.

Glue line 19 may be formed by coating the back sheet 13' with the film forming glue line material prior to lamination. The film then fuses to the phenolic or other thermosetting resin in the back sheet 13' during lamination.

The release film 17 may be selected from any film material which does not soften and/or become tacky during heat and pressure consolidation. For this purpose, polypropylene, polybutylene, polyethylene terephthalate and the like may be used. The thickness of film 17 is not critical and it is limited only by the ease of handling which generally requires a film of ½ mil or more in thickness.

The material forming the glue line 19 is a critical feature of the present invention. For reasons not clearly understood, only three materials have been found satisfactory. These are polyvinyl alcohol, animal glue and starch. Animal gelatin, which is a more refined type of animal glue, also functions satisfactorily and as used herein, is included in the definition of animal glue. Of these, polyvinyl alcohol is preferred. The thickness of the glue line 19 is not critical but generally it should be over 1/10 of a mil.

Filler, cross linking agents and wetting agents may be added to the glue line 19. The amounts of polyvinyl alcohol or animal glue used should be sufficient to form a substantially continuous film capable of integral transfer during heat and pressure consolidation. Generally, this requires at least 10% of the glue to be polyvinyl alcohol or animal glue of a dry solid basis and preferably the glue line 19 is at least 49% by weight polyvinyl alcohol.

While not necessary, a filler such as talc may be added to improve glue bond especially when adhesives such as urea-formaldehyde is used to adhere the laminate to its supporting substrate.

Cross linking agents such as formaldehyde and/or glyoxal may also be used to assure that polyvinyl alcohol is water insolubilized assuring the prevention of moisture swell in the finished laminate.

A wetting agent such as that marketed under the trademark Calgon (sodium hexamethaphosphate) may be added to enhance the wettability of the surface.

The following is an Example of the present invention.

The following coating composition was prepared comprising on a dry solid basis:

| | |
|---|---|
| Polyvinyl | 100 parts |
| Talc | 43 parts |
| Calgon (sodium hexamethaphosphate | 10 parts |
| Formaldehyde | 1.33 parts |
| Glycerol | 1.33 parts |

A coating batch was prepared by mixing a 20 percent aqueous solution of polyvinyl alcohol with a 50 percent slurry of talc and Calgon with the proportions being as above set forth. A 37 percent aqueous solution of formaldehyde and a 40 percent solution of glycerol was then added to the batch in proportional amounts as above set forth.

This batch was then diluted with water so as to provide a viscosity of 800 centipoises so as to make the same suitable for coating.

The coating batch was then coated on a polypropylene film, which was about one mil thick, by use of a wire rod to provide a coating thickness of one mil. This was dried to 200° F for 2 minutes and the polypropylene coating was then coated on its opposite surface to the same thickness with the coating material so as to provide identical coatings on both surfaces of the film.

The release medium so formed was then placed between two assemblies of sheets as in FIG. 1 that were to be formed into decorative laminates. The heat and pressure was applied as is conventional in decorative laminating at 350° F for 12 minutes.

The assemblies were then removed and reaily separated from the release medium. The coating on the release medium was completely transferred to the laminates.

The laminates so formed were then adhered to a supporting substrate of particle board using urea-formaldehyde and phenol resorcinol.

The laminates together with the adhered substrates of particle board were tested by first heating and then cooling the laminates over wide temperature ranges. The supporting particle board was then pulled away and a break occured internally of the particle board rather than along the glue line as would otherwise occur with a non-sanded back sheet.

EXAMPLE II

The same coating material prepared in Example I was prepared except that animal glue was substituted for polyvinyl alcohol. The results were substantially identical to those found in Example I.

EXAMPLE III

The same coating material prepared in Example I was prepared except that starch was substituted for polyvinyl alcohol. The results were substantially identical to those found in Example I.

We claim:

1. A process for forming a laminate comprising the steps of assembling a plurality of superimposed plies of thermosetting resin impregnated sheets between heated platens, placing a release medium between the heated platens and adjacent the back surface of the bottom most ply of said sheets, transferring a glueable coating from said release medium to said back surface while consolidating said assembly by applying heat and pressure through said heated platens and applying sufficient heat to cure said resin thereby firmly anchoring said glueable coating to said bottom-most ply, said glueable coating being formed of a substance including a material selected from the group consisting a polyvinyl alcohol, animal glue and starch.

2. A process as defined by claim 1 comprising a second assembly of a plurality of superimposed plies of thermosetting resin impregnated sheets, placing said second assembly back to back with said first mentioned assembly with said release medium therebetween and transferring a second glueable coating to the back surface of said second assembly during heat and pressure consolidation.

* * * * *

UNITED STATES PATENT AND TRADEMARK OFFICE
CERTIFICATE OF CORRECTION

PATENT NO. : 4,030,955
DATED : June 21, 1977
INVENTOR(S) : Christo Antonio et al.

It is certified that error appears in the above-identified patent and that said Letters Patent are hereby corrected as shown below:

Column 4, Line 43 "a", second occurrence, should be -- of -- .

Signed and Sealed this

Sixteenth Day of May 1978

[SEAL]

Attest:

RUTH C. MASON
Attesting Officer

LUTRELLE F. PARKER
Acting Commissioner of Patents and Trademarks